United States Patent
Gaides et al.

(10) Patent No.: US 8,213,082 B2
(45) Date of Patent: Jul. 3, 2012

(54) LIGHT CONTROL FILM

(75) Inventors: Gary E. Gaides, Woodbury, MN (US);
Michael E. Lauters, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 135 days.

(21) Appl. No.: 12/809,358

(22) PCT Filed: Dec. 8, 2008

(86) PCT No.: PCT/US2008/085889
§ 371 (c)(1),
(2), (4) Date: Jun. 18, 2010

(87) PCT Pub. No.: WO2009/085581
PCT Pub. Date: Jul. 9, 2009

(65) Prior Publication Data
US 2010/0271721 A1    Oct. 28, 2010

Related U.S. Application Data

(60) Provisional application No. 61/015,760, filed on Dec. 21, 2007.

(51) Int. Cl.
*G03B 21/56* (2006.01)
(52) U.S. Cl. ......... 359/452; 359/460; 359/613; 359/614
(58) Field of Classification Search .................. 359/452, 359/460, 613, 614
See application file for complete search history.

(56) References Cited

U.S. PATENT DOCUMENTS

| 4,267,814 A | 5/1981 | Benson |
| 4,576,850 A | 3/1986 | Martens |
| 4,621,898 A * | 11/1986 | Cohen ........................ 359/601 |
| 4,766,023 A | 8/1988 | Lu |
| 5,022,797 A | 6/1991 | Sawa |
| 5,204,160 A | 4/1993 | Rouser |

(Continued)

FOREIGN PATENT DOCUMENTS

JP    2003-66206    3/2003

(Continued)

OTHER PUBLICATIONS

Evans, R. W., and Allen, D. M., "Fabricating diamond microtools with focused ion beam machining", Proceedings of the euspen International Conference, 5 pages, Zurich, May 2008.

(Continued)

*Primary Examiner* — Mark Consilvio
(74) *Attorney, Agent, or Firm* — Kristofor L. Storvick

(57) ABSTRACT

Provided is a light control film and displays incorporating same. In particular, provided are light control films comprising a light input surface and a light output surface opposite the light input surface. The light control films further comprise alternating transmissive and absorptive regions disposed between the light input surface and the light output surface. Each transmissive region has an index of refraction N1, and each absorptive region having an index of refraction N2, where N2-N1 is not less than-0.005. The light control films have an average pitch of successive absorptive regions of 0.070 mm or less. Light incident to the light input surface exits the light output surface with a maximum relative brightness ratio (RBR) in a direction perpendicular to the light output surface of 65 or greater, and exits the light output surface with an effective polar viewing angle (EPVA) of 45° or less.

18 Claims, 4 Drawing Sheets

U.S. PATENT DOCUMENTS

| | | | |
|---|---|---|---|
| 5,254,388 | A | 10/1993 | Melby et al. |
| 5,462,700 | A | 10/1995 | Beeson |
| 5,481,385 | A | 1/1996 | Zimmerman |
| 5,486,949 | A | 1/1996 | Schrenk et al. |
| 5,612,820 | A | 3/1997 | Schrenk et al. |
| 5,783,120 | A | 7/1998 | Ouderkirk et al. |
| 5,825,543 | A | 10/1998 | Ouderkirk et al. |
| 5,828,488 | A | 10/1998 | Ouderkirk et al. |
| 5,839,823 | A | 11/1998 | Hou |
| 5,882,774 | A | 3/1999 | Jonza et al. |
| 6,111,696 | A | 8/2000 | Allen et al. |
| 6,297,908 | B1 | 10/2001 | Suga |
| 6,353,204 | B1 | 3/2002 | Spaay |
| 6,398,370 | B1 | 6/2002 | Chiu et al. |
| 6,417,966 | B1 * | 7/2002 | Moshrefzadeh et al. ..... 359/453 |
| 6,636,344 | B2 | 10/2003 | Akasaka et al. |
| 6,822,792 | B2 | 11/2004 | Goto |
| 7,057,810 | B2 | 6/2006 | Thomas |
| 7,180,210 | B1 | 2/2007 | Jorgenson et al. |
| 7,180,664 | B2 | 2/2007 | Goto |
| 7,184,210 | B2 | 2/2007 | Thomas |
| 7,271,955 | B2 * | 9/2007 | Osawa et al. ................ 359/453 |
| 7,686,463 | B2 | 3/2010 | Goto |
| 7,746,554 | B2 * | 6/2010 | Katsura et al. ............... 359/455 |
| 7,835,078 | B2 * | 11/2010 | Ichikawa et al. ............. 359/443 |
| 8,012,567 | B2 * | 9/2011 | Gaides et al. ................ 428/172 |
| 8,013,807 | B2 * | 9/2011 | Cha et al. ..................... 345/60 |
| 2002/0167725 | A1 * | 11/2002 | Goto ............................ 359/456 |
| 2005/0041311 | A1 | 2/2005 | Mi |
| 2005/0213245 | A1 * | 9/2005 | Katsura et al. ................ 360/125 |
| 2006/0103779 | A1 | 5/2006 | Amemiya et al. |
| 2006/0104084 | A1 | 5/2006 | Amemiya et al. |
| 2006/0145578 | A1 | 7/2006 | Park |
| 2006/0245060 | A1 | 11/2006 | Goto |
| 2007/0153377 | A1 | 7/2007 | Goto |
| 2007/0160811 | A1 | 7/2007 | Gaides et al. |
| 2009/0213593 | A1 * | 8/2009 | Foley et al. .................. 362/333 |
| 2009/0284836 | A1 * | 11/2009 | Boyd et al. .................. 359/613 |
| 2010/0201242 | A1 * | 8/2010 | Liu et al. ...................... 313/112 |
| 2010/0328777 | A1 * | 12/2010 | Kashiwagi ................... 359/614 |

FOREIGN PATENT DOCUMENTS

| | | |
|---|---|---|
| JP | 2004-012918 | 1/2004 |
| JP | 2004-062084 | 2/2004 |
| JP | 2005-338270 | 8/2005 |
| JP | 2006-084876 | 3/2006 |
| JP | 2006-085050 | 3/2006 |
| JP | 2007-030095 | 2/2007 |
| KR | 10-0753591 | 8/2007 |
| KR | 10-2008-0038778 | 5/2008 |
| WO | 2009/052052 | 4/2009 |

OTHER PUBLICATIONS

Evans, R. W., and Allen, D. M., "Fabricating diamond microtools with focused ion beam machining", Presentation Slides from Proceedings of the euspen International Conference, 11 pages, Zurich, May 2008.

* cited by examiner

LIGHT CONTROL FILM

Cross Reference to Related Applications

This application is a national stage filing under 35 U.S.C. 371 of PCT/US2008/085889, filed Dec. 8, 2008, which claims priority to U.S. Provisional Application No. 61/015,760, filed Dec. 21, 2007, the content of which is incorporated herein in its entirety.

FIELD

This description generally relates to light control films and displays incorporating same. In particular, the description relates to light control films having improved transmission of light.

BACKGROUND

Light control film (LCF), also known as light collimating film, is an optical film that is configured to regulate the transmission of light. Various LCFs are known, and typically include a light transmissive film having a plurality of parallel grooves wherein the grooves are formed of a light-absorbing material.

LCFs can be placed proximate a display surface, image surface, or other surface to be viewed. At normal incidence, (i.e. 0 degree viewing angle) where a viewer is looking at an image through the LCF in a direction that is perpendicular to the film surface, the image is viewable. As the viewing angle increases, the amount of light transmitted through the LCF decreases until a viewing cutoff angle is reached where substantially all the light is blocked by the light-absorbing material and the image is no longer viewable. This can provide privacy to a viewer by blocking observation by others that are outside a typical range of viewing angles.

LCFs can be prepared by molding and ultraviolet curing a polymerizable resin on a polycarbonate substrate. Such LCFs are commercially available from 3M Company, St. Paul, Minn., under the trade designation "3M™ Filters for Notebook Computers and LCD Monitors".

Advances in display technology have resulted in brighter, higher resolution and more energy efficient displays that consumers want. The brightness and resolution of a display can be reduced when an LCF is positioned in front of the display for security or other purposes. It would be desirable to have an LCF which does not reduce the brightness and resolution of a display.

SUMMARY

In one aspect, the present description relates to light control films comprising a light input surface and a light output surface opposite the light input surface. The light control films further comprise alternating transmissive and absorptive regions disposed between the light input surface and the light output surface. Each transmissive region has an index of refraction N1, and each absorptive region having an index of refraction N2, where N2−N1 is not less than −0.005. The light control films have average pitch of successive absorptive regions of 0.070 mm or less. Light incident to the light input surface exits the light output surface with a maximum relative brightness ratio (RBR) in a direction perpendicular to the light output surface of 65 or greater, and exits the light output surface with an effective polar viewing angle (EPVA) of 45° or less. In some embodiments, the absorptive region may have a width at its narrowest end of 8 µm or less.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
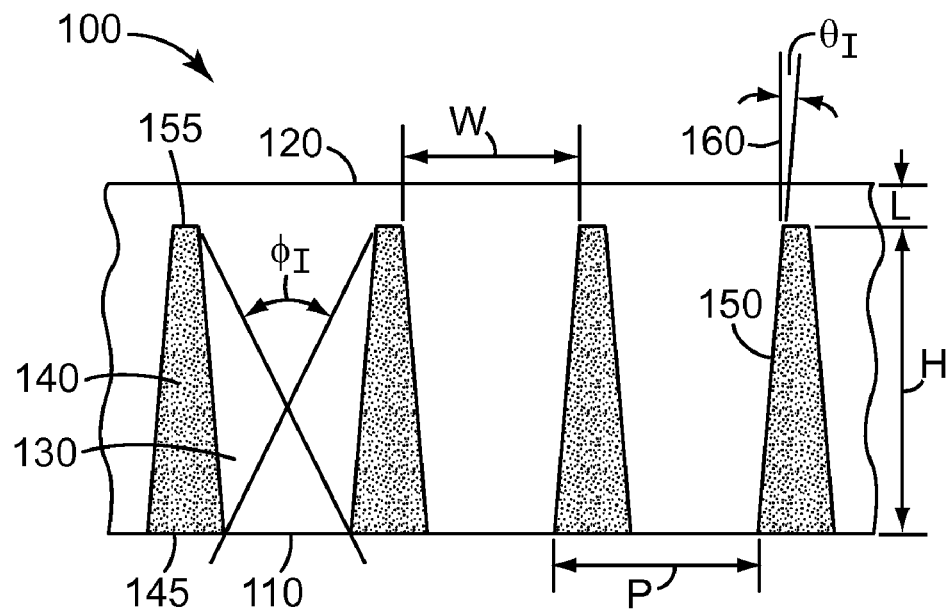
FIG. 1 is a cross-section view of an LCF.

The present application is directed to an LCF having an increased brightness and uniformity of transmitted light while maintaining a well-defined viewing cutoff angle. In particular, the present application provides an LCF having a combination of one or more of the following properties: a smaller absorptive region pitch, a smaller aspect ratio of top surface to base of absorptive regions, index of refraction selection for absorptive and transmissive regions selected so as to reduce or eliminate total internal reflections (TIR), a lower (or even eliminated) bias angle for onset of moiré, a higher on-axis brightness, and a smaller aspect ratio of absorptive region to transmissive region.

Reducing or eliminating the bias angle for onset of moiré can be very important to LCF users or installers. For instance, LCFs are often intended to work at a bias angle of 0° or 90°. That is, the louver orientation is often intended to be either horizontal (thus providing vertical privacy) or vertical (thus providing horizontal privacy). Some non-zero or non-normal bias angle is often required for the LCF in order to minimize or eliminate moiré (which may be caused by interference e.g. between the pixel pitch in an LCD and the louver pitch of the LCF). The appearance of moiré may be eliminated, for instance, by converting a horizontal or vertical LCF sheet into a sheet having a bias angle by cutting the sheet at an angle with respect to the louvers (i.e. where the louvers are neither parallel nor perpendicular to the edges of the part). If unaccounted for, reduced image quality can be imparted by moiré. Attempts to eliminate moiré can lead to significant waste in converting LCF parts by cutting them to accommodate bias angles.

The LCFs described herein are made to ensure that the absorptive regions absorb as much of the incident light as possible. This includes using an absorptive medium (e.g., carbon black), having a particle size small enough to pack the absorptive region so as to allow enough absorption to minimize light leakage. Highly absorptive regions minimize the amount of light that may leak through these regions, and therefore control the directionality and the privacy function of the LCF.

Incident light that is reflected from LCF absorptive regions described herein is also minimized to reduce spurious, or "ghost" images, that can arise from such reflections.

This is done by ensuring that the index of refraction of the absorptive regions relative to the transmissive regions is selected so as to minimize reflections (in particular, to minimize or eliminate TIR). For instance, in some embodiments, the index of refraction of the absorptive region, N2, is selected such that, in relation to the index of refraction of the transmissive region, N1, the relationship satisfies: N2−N1≧−0.005.

An LCF can be placed between a viewer and an image plane of a display to limit the viewing angle of an image. Image planes can be included, for example, in a Liquid Crystal Display (LCD), a graphics display, and an indicia display.

As mentioned, the relative refractive indices of the absorptive and transmissive regions may be selected for the presently described LCFs. This selection may result in a reduction of ghost images produced by reflections within the LCF. When the refractive index of the transmissive region is less than the refractive index of the absorptive region, some of the light incident to the interface between them is refracted into the absorptive region and absorbed (Fresnel relations determine how much is absorbed and reflected as a function of angle of incidence and refractive index difference, with the highest amount of reflection occurring at or near so-called grazing angles). The refractive indexes of the two regions can be essentially "matched" so that the absorptive region refractive index is slightly higher than (if not equal) to the transmissive region, and reflections are essentially eliminated While the brightness of a display incorporating an LCF can be increased when incident light undergoes TIR from the interface between the absorptive and transmissive regions, this can lead to ghosting as described above. Whether a light ray will undergo TIR or not, can be determined from the incidence angle with the interface, and the difference in refractive index of the materials used in the transmissive and absorptive regions. When the refractive index of the absorptive region is no greater than the refractive index of the transmissive region, for instance the index of refraction of the transmissive region is greater than the index of refraction of the light absorptive region by more than about 0.005, TIR may occur.

FIG. 1 shows a cross-sectional view of an LCF 100 that includes a light output surface 120 and a light input surface 110 opposite light output surface 120. While described herein as light input surface and light output surface for reference purposes, it will be recognized that in use, the LCFs described herein may have either a light output surface facing a viewer or a display source and the light input surface may either be facing a display source or a viewer. LCF 100 includes alternating transmissive regions 130, absorptive regions 140, and an interface 150 between transmissive regions 130 and absorptive regions 140. Transmissive regions 130 have a base width "W" disposed apart from each other by a pitch "P", and include a land region "L" between absorptive regions 140 and light output surface 120. Absorptive regions 140 have a base 145, a top surface 155, a height "H" and are displaced apart from each other by pitch "P". Interface 150 forms an interface angle $\theta_I$ with a normal 160 to light output surface 120. As described herein, by "normal" to a surface is meant perpendicular to the major plane of the surface, discounting any local variation in surface smoothness. LCF 100 includes an internal viewing cutoff angle $\Phi_I$ defined by the geometry of alternating transmissive regions 130 and absorptive regions 140.

Figure 2:
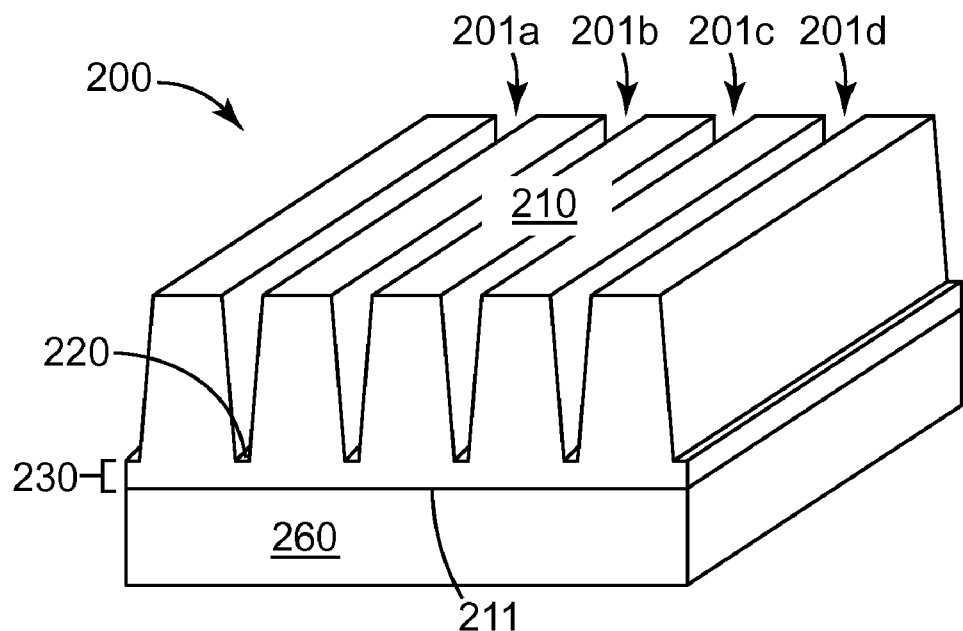
FIG. 2 is a perspective view of a microstructured film article.

FIG. 2 shows a microstructured film article 200 comprising at least one microstructured surface 210, which can be used to make an LCF. In one embodiment, microstructured surface 210 can include a plurality of grooves 201a-201d. As shown in FIG. 2, a continuous land layer 230 can be present between the base of the grooves 220 and the opposing surface 211 of microstructured film article 200. Grooves 220 may alternatively extend all the way through the microstructured film article 200 (not shown). Microstructured film article 200 may also include a base substrate layer 260, which can be integrally formed with, or separately added to microstructured film article 200 (whether by extrusion, cast-and-cure, or some other method).

Figure 3:
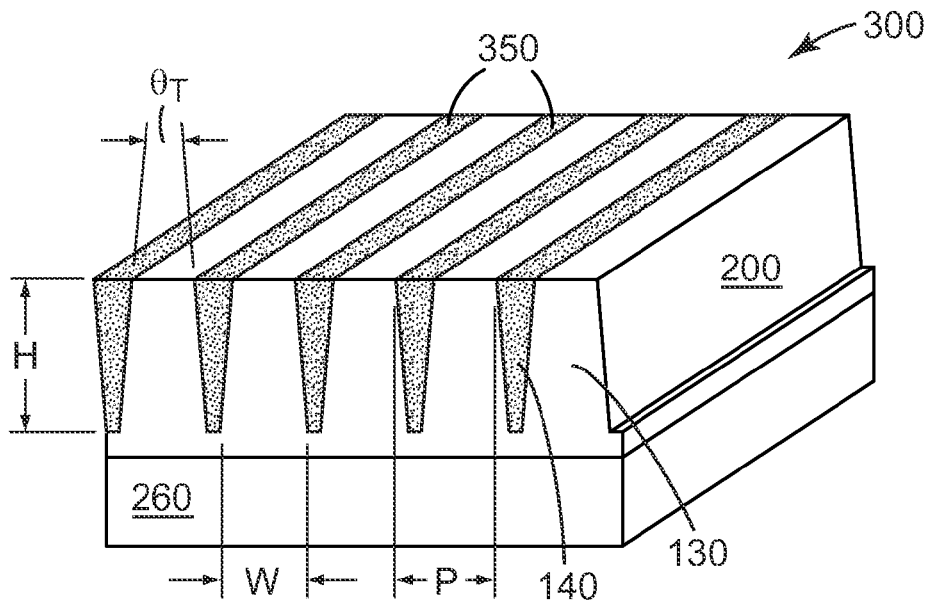
FIG. 3 is a perspective view of an LCF.

FIG. 3 shows an LCF 300 wherein grooves 201a-201d of FIG. 2 have been rendered light-absorbing by filling them with light absorbing material 350. Light absorbing material 350 in the shape of grooves 201a-201d of microstructured film 200 is hereinafter referred to as absorptive region 140 (as shown in FIG. 3, et seq.).

Figure 4:
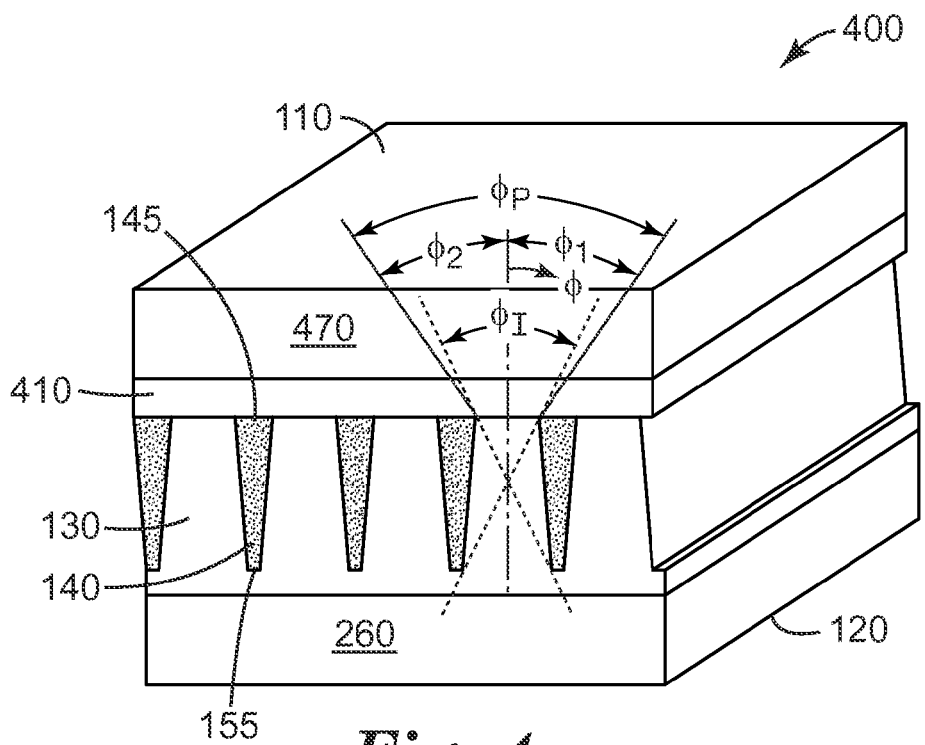
FIG. 4 is a perspective view of an LCF.

FIG. 4 shows LCF 400 that further includes an optional cover film 470 that can be the same material as, or different than, base substrate layer 260. Materials for optical cover film 470 or base substrate layer 260 may include, for instance, commercially available polycarbonate films. The particular polycarbonate material may be selected so as to provide a matte finish or a glossy finish. Optical cover film 470 and base substrate layer 260 may either or both be matte or glossy. Any of the four combinations are contemplated herein. Optional cover film 470 can be bonded to the microstructured surface with an adhesive 410. Adhesive 410 can be any optically clear adhesive, such as a UV-curable acrylate adhesive, a transfer adhesive, and the like. LCF 400 also includes light input surface 110 and light output surface 120 opposite light input surface 110, together defining a major plane. Again, it is to be understood that for the purposes of describing the embodiments presented herein, LCF 400 is positioned such that light input surface 110 is disposed proximate to a base 145 of absorptive region 140, however, light input surface 110 can also be disposed opposite base 145, proximate to top surface 155. In other words, LCF 400 can be positioned such that base 145 is closer to a light source (not shown) that injects light into light input surface 110, or it can also be positioned such that top surface 155 is closer to a light source (not shown).

As shown in FIGS. 3 and 4 (and more particularly labeled in FIG. 1), transmissive regions 130 between absorptive regions 140 have an included wall angle $\theta_T$, a transmissive region base width "W", an effective height "H", a pitch "P" (each shown in FIG. 3), and a polar viewing cutoff angle $\Phi_P$ (shown in FIG. 4). Included wall angle $\theta_T$ is two times the interface angle $\theta_I$ shown in FIG. 1 for symmetric absorptive regions. In one case, interface angle $\theta_I$ can be different for each interface 150, and included wall angle $\theta_T$ is equal to the sum of the interface angles $\theta_I$ on each side of absorptive region 140, for an unsymmetrical absorptive region. Polar viewing cutoff angle $\theta_P$ can be determined by applying Snell's law to the rays defining the internal viewing cutoff angle $\theta_I$, using the indices of refraction of optional cover film 470, adhesive 410, transmissive regions 130, base substrate layer 260, and the material that LCF 400 is immersed in (typically air). Polar viewing cutoff angle $\theta_P$ is equal to the sum of a polar viewing cutoff half angle $\Phi_1$ and a polar viewing cutoff half angle $\Phi_2$ each of which are measured from the normal to light input surface 110. In some cases, polar viewing cutoff angle $\theta_P$ can be symmetric, and polar viewing cutoff half angle $\Phi_1$ is equal to polar viewing cutoff half angle $\Phi_2$. In some cases, polar viewing cutoff angle $\Phi_P$ can be asymmetric, and polar viewing cutoff half angle $\Phi_1$ is not equal to polar viewing cutoff half angle $\Phi_2$. For the purposes of this disclosure, an angle "$\Phi$" shown in FIG. 4 and measured from the normal to light input surface 110 along the direction shown, is herein referred to as a "polar viewing angle". The polar viewing angle Φ can range from 0° (i.e. normal to light input surface 110) to 90° (i.e. parallel to light input surface 110).

In some embodiments, the ratio of the top surface 155 length to base 145 of absorptive region 140 is 0.65 or smaller, for instance, 0.60 or smaller, or even 0.56 or smaller.

The material properties of transmissive regions 130, included wall angle $\Phi_T$, pitch "P", and transmissive region base width "W" can impact light transmission through LCF 400. LCFs can have relatively large included wall angles, such as greater than 10 degrees or more. Larger wall angles increase the width of the light absorbing regions, thereby decreasing transmission at normal incidence. Smaller wall angles are preferred, such as less than 10 degrees, so that the transmission of light at normal incidence can be made as large as possible.

In some embodiments, LCFs described herein have an included wall angle of not greater than 6°. In other embodiments, the included wall angle is not greater than 5°, such as up to 5°, 4°, 3°, 2°, 1° or 0.1°. As described herein, the included wall angle can be related to the interface angle for symmetric and asymmetric absorptive regions. As such, in one aspect, the interface angle can be 3°, or not greater than 3°, for example not greater than 2.5°, 2°, 1°, or 0.1°. Smaller wall angles can form grooves having a relatively high aspect ratio (H/W) at a smaller pitch "P", and can provide a sharper image cutoff at lower viewing angles. In some cases, the transmissive regions have an average height, "H", and an average width at its widest portion, "W", and H/W is at least 1.75. In some cases, H/W is at least 2.0, 2.5, 3.0 or greater.

The LCFs described herein can be made to have any desired polar viewing cutoff angle. In one aspect, the polar viewing cutoff angle ranges from 40° to 90° or even higher. The polar viewing cutoff angle $\theta_P$, can be determined as discussed elsewhere by the parameters "$\theta_1$", "H", "W", "P", and the indices of refraction the LCF materials.

In some cases, it can also be useful to define an "effective polar viewing angle" which includes light transmitted through the LCF at angles larger than the polar viewing cutoff angle. For example, light that intercepts the absorptive regions at angles slightly larger than the internal viewing cutoff angle $\Phi_I$ can "bleed through" the thinnest portions of the absorptive region (i.e. partially transmit through the top and bottom of the light absorbing regions represented as trapezoids shown in FIG. 1). Further, light traveling normal to the plane of the LCF may scatter and stray outside the effective polar viewing angle. The effective polar viewing angle as used herein is defined as the angle at which the relative brightness ratio decreases to 5% or less. The relative brightness ratio is the ratio (expressed as a percentage) of the brightness of a diffuse light source as measured through an LCF to the brightness of the same diffuse light source as measured without the LCF. The specifics of the relative brightness ratio measurement are further described in the Examples below.

Also used in the art is the term "functional polar viewing angle" which also includes light transmitted through the LCF at angles larger than the polar viewing cutoff. The functional polar viewing angle is defined as the angle at which the brightness of the display with LCF decreases to a small percentage of the axial brightness of the display with LCF, for example 10%, 5% or even less. Such a view angle definition, however, may be display dependent.

Light absorbing materials for the light absorbing regions in LCFs can be any suitable material that functions to absorb or block light at least in a portion of the visible spectrum. In some embodiments, the light absorbing material can be coated or otherwise provided in grooves or indentations in a light transmissive film to form light absorbing regions. In further embodiments, light absorbing materials can include a black colorant, such as carbon black. The carbon black may be a particulate carbon black having a particle size less than 10 microns, for example 1 micron or less. The carbon black may, in some embodiments, have a mean particle size of less than 1 micron. In yet further embodiments, the absorbing material, (e.g., carbon black, another pigment or dye, or combinations thereof) can be dispersed in a suitable binder. Light absorbing materials also include particles or other scattering elements that can function to block light from being transmitted through the light absorbing regions.

Reflections at the light transmissive region/light absorbing region interface can be controlled by mismatching the relative index of refraction of the light transmissive material and the index of refraction of the light absorbing material over at least a portion of the spectrum, for example the human visible spectrum. In some cases, the index of refraction of the cured transmissive regions (N1) is greater than the index of refraction of the cured light absorptive regions (N2) by less than about 0.005. In such cases, the index of refraction difference, (N2−N1) is not less than −0.005, or, (N2−N1) is greater than or equal to −0.005.

The LCFs described herein include a plurality of light absorbing regions. In some embodiments, the light absorbing regions can be a plurality of channels, as shown elsewhere in the description. In some cases, the LCF can include a plurality of columns such as shown in FIG. 2b of U.S. Pat. No. 6,398,370 (Chiu et al.). In some cases, the LCF described herein can be combined with a second LCF, as also described in U.S. Pat. No. 6,398,370. In other embodiments, the light absorbing regions are columns, posts, pyramids, cones and other structures that can add angular-dependent light transmitting or light blocking capabilities to a film.

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin. In some cases, polymerizable resin compositions useful for the LCF of the present description can include polymerizable resin compositions such as are described in U.S. Publication No. 2007/0160811 (Gaides et al.), to the extent that those compositions satisfy the index and absorption characteristics herein described.

A microstructure-bearing article (e.g. microstructured film article 200 shown in FIG. 2) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the base film can optionally be primed or otherwise be treated to promote adhesion of the optical layer to the base.

The polymerizable resin compositions described herein are suitable for use in the manufacture of other light transmissive and/or microstructured articles including for example brightness enhancing films and the like. The term "microstructure" is used herein as defined and explained in U.S. Pat. No. 4,576,850 (Martens). Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005, +/−0.1 or, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

The chemical composition and thickness of the base material can depend on the requirements of the product that is being constructed. That is, balancing the needs for strength, clarity, optical retardance, temperature resistance, surface energy, adherence to the optical layer, among others. In some cases, the thickness of the base layer can be at least about 0.025 millimeters (mm) and can be from about 0.1 mm to about 0.5 mm.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base material can contain mixtures or combinations of these materials. In one case, the base may be multi-layered or may contain a dispersed component suspended or dispersed in a continuous phase.

In one aspect, examples of base materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN® polycarbonate film 8010, available from GE Polymershapes, Seattle Wash., and Panlite 1151, available from Teijin Kasei, Alpharetta Ga.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.); U.S. Pat. No. 5,783,120 (Ouderkirk et al.); U.S. Pat. No. 5,882,774 (Jonza et al.); U.S. Pat. No. 5,612,820 (Schrenk et al.) and U.S. Pat. No. 5,486,949 (Schrenk et al.). The use of these polarizer films in combination with prismatic brightness enhancement film has been described, for example, in U.S. Pat. No. 6,111,696 (Allen et al.) and U.S. Pat. No. 5,828,488 (Ouderkirk et al.). Films available commercially are multilayer reflective polarizer films such as Vikuiti™ Dual Brightness Enhancement Film "DBEF", available from 3M Company.

The base materials listed herein are not exclusive, and as will be appreciated by those of skill in the art, other polarizing and non-polarizing films can also be useful as the base for the optical products of the description. These base materials can be combined with any number of other films including, for example, polarizing films to form multilayer structures. The thickness of a particular base can also depend on the desired properties of the optical product.

Figure 5:
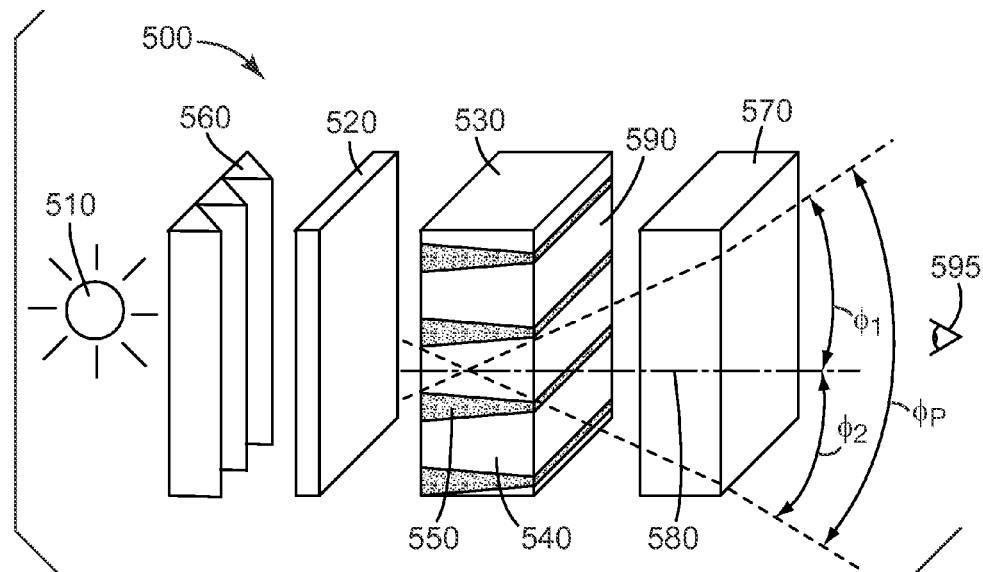
FIG. 5 is a perspective schematic of a backlit display.

FIG. 5 shows a perspective schematic of a backlit display 500 according to one exemplary aspect the present description. Backlit display 500 includes an LCF 530 to define a polar viewing cutoff angle $\Phi_P$ of light leaving an output surface 590 of LCF 530. Polar viewing cutoff angle $\Phi_P$ includes a polar viewing cutoff half angle $\Phi_1$ and a polar viewing cutoff half angle $\Phi_2$ measured from a normal 580 to light output surface 590, as described elsewhere. LCF 530 includes transmissive regions 540 and absorptive regions 550 as described elsewhere. Backlit display 500 includes a light source 510 configured to transmit light through optional prismatic film 560; then through an image plane 520 (such as an LCD panel), and finally through LCF 530, and on to a viewer 595. Backlit display 500 may further include optional cover layer 570, which optional cover layer may provide, for instance, an anti-glare coating, an anti-reflective coating, an anti-soiling coating, or some combination thereof. The viewing angle at which the brightness is a maximum, can depend on whether the polar viewing cutoff angle is symmetric about normal 580 or is asymmetric, as described elsewhere. In one aspect, the brightness of backlit display 500 can be greatest along normal 580 (referred to as the "axial brightness"), and decrease as the viewing angle is increased. For asymmetric polar viewing cutoff angles, the maximum brightness may not be coincident with normal 580.

As described throughout, the LCFs described herein provide viewing cutoff angles that can provide privacy functionality in the direction perpendicular to the direction of the absorptive regions. This may be beneficial in privacy application, but also may be useful, for instance, in contrast enhancement for plasma display panels and in anti-reflective properties for automobile applications. In particular, many automobile instrument panels provide a lighted display, for instance, a liquid crystal display (LCD). The light from such displays may, however, reflect off of the front windshield, distracting or obstructing the view of the driver or passenger.

Some LCFs described herein may provide relief from such front windshield reflection by cutting off light directed vertically.

It is beneficial, in some instance, to allow for more light to be observed in the direction parallel to the direction of the absorptive regions. For instance, in the automotive application described above, it may be beneficial to provide maximum brightness to the driver and the passenger in reading the display panel while limiting the amount of light reflecting from the front windshield. In some embodiments of the present description, the LCFs described herein allow for more light to transmit though the LCF in the louver direction (by louver direction, it is meant the direction parallel to the direction of the absorptive regions, regardless of whether in installation this represents a vertical or horizontal direction). This can be expressed as the minimum RBR value measured in the direction parallel to the louvers (absorptive regions), over a range of ±20° from normal (hereinafter referred to as MB20). In some embodiments of the LCFs described herein, the LCF has an MB20 of 60 or greater, for instance, 62 or greater, even 64 or greater.

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification. The foregoing description can be better understood by consideration of the embodiments shown by the modeling results and examples that follow.

EXAMPLES

Refractive Index Determination of Cured Resins

The transmissive material resins described herein were separately mixed, and coated between a 0.008 inch (0.20 mm) PC film and an unprimed 0.005 inch PET film using a precision laboratory drawdown coater (manufactured by ChemInstruments) to a thickness of approximately 50 µm. The resulting laminate was cured using UV radiation (1 pass, 25 feet per minute, one-side exposure with two Fusion D bulbs), and the PET coversheet was removed. The refractive index of the photopolymerized resins were measured using a Metricon Model 2010 Prism Coupler System (Metricon Corp, Pennington N.J.) at a wavelength of 633 nm. Due to the presence of the carbon black in absorptive material resins, this method could not be used for those mixtures.

The calculated refractive index of the resins was each determined from published refractive index values for each of the individual components at a wavelength of 512 nm. A linear mixing rule was used. The increase in refractive index due to the addition of carbon black was 0.009 for every 1% carbon black added by weight to each mixture.

Preparation of Microstructured Films

Microstructured films were made by molding and ultraviolet (UV) light curing a resin mixture containing 94% by weight Photomer 6010 (an aliphatic urethane diacrylate available from Cognis, Cincinnati Ohio), 5% by weight SR-285 (tetrahydrofurfuryl acrylate available from Sartomer, Exton Pa.), and 1% by weight Darocur 1173 (a photoinitiator available from Ciba Specialty Chemicals, Tarrytown N.Y.) on a 0.007 inch (0.178 mm) polycarbonate (PC) film to give a cured resin having a refractive index of 1.498. For these structured films, a cylindrically-shaped metal roll with finely detailed channels cut into its outer surface served as the mold.

The resinous mixture was first coated onto the PC substrate film, and then pressed firmly against the metal roll in order to completely fill the mold. Upon polymerization the structured film was removed from the mold. The resulting structure in the cured resin was a series of evenly spaced channels, each having a nominally trapezoidal cross-section. The cured resin channels were about 48 microns wide (at their narrowest), about 148 microns deep, and spaced at about a 64 micron pitch. The included wall angle, $\theta_T$, was about 3.6°. FIG. 2 is representative of such a microstructured film.

Preparation of Light Collimating Films

Light collimating films were made by filling the gaps between the transparent channels of the microstructured film with absorptive material-containing resin. The absorptive material-containing resin mixture contains 67% by weight Photomer 6210 (an aliphatic urethane diacrylate available from Cognis), 20% by weight 9B385 (a carbon black UV curable paste available from Penn Color, Doylestown Pa.), and 10% by weight SR285. The absorptive material-containing resin also contained 1% each of Irgaucre 369, Irgacure 819, and Darocur 1173, each of which are photoinitiators available from Ciba Specialty Chemicals, Tarrytown N.Y. Excess black-containing resin was wiped from the surfaces of the transparent channels. The resin mixture has a calculated refractive index of 1.514. The carbon black filled channels were then cured using UV radiation, resulting in a light collimating film similar to that shown in FIG. 3. Each light collimating film was laminated to a 0.007 inch (0.178 mm) PC coversheet film using an optically clear UV-curable acrylate adhesive. FIG. 4 is representative of such a light collimating film.

Example Film 1 and Comparative Example Film A were prepared as described above with the following geometric properties:

TABLE 1

| Geometric Parameter | Example Film 1 | Comparative Example Film A |
|---|---|---|
| P (µm) | 64.3 | 71.1 |
| Top surface (155) (µm) | 8 | 14.8 |
| H (µm) | 148 | 148 |
| Base (145) (µm) | 14.3 | 21.1 |
| $\Theta_I$ (degrees) | 1.8 | 1.8 |
| W (µm) | 48 | 48 |

Relative Brightness Ratio Measurements

Relative Brightness Ratio (RBR) of the films was measured using an Eldim 80 Conoscope (Eldim Corp., France). The LCFs were placed on top of a diffusely transmissive hollow light box. The luminance (cd/m$^2$) (brightness) profiles of the light box with the LCFs was measured and the ratio of this value to the value obtained without the LCFs is reported herein as an RBR.

The diffuse transmission of the light box can be described as Lambertian. The light box was a six-sided hollow cube measuring approximately 12.5 cm×12.5 cm×11.5 cm (L×W× H) made from diffuse polytetrafluoroethylene (PTFE) plates of ~6 mm thickness. One face of the box was chosen as the sample surface. The hollow light box had a diffuse reflectance of ~0.83 measured at the sample surface (e.g. ~83%, averaged over the 400-700 nm wavelength range). During the RBR testing, the box was illuminated from within through an ~1 cm circular hole in the bottom of the box (opposite the sample surface, with the light directed toward the sample surface from inside). The illumination was provided using a stabilized broadband incandescent light source attached to a fiber-optic bundle used to direct the light (Fostec DCR-II with a 1 cm diameter fiber bundle extension from Schott-Fostec LLC, Marlborough Mass. and Auburn, N.Y.).

Figure 6:
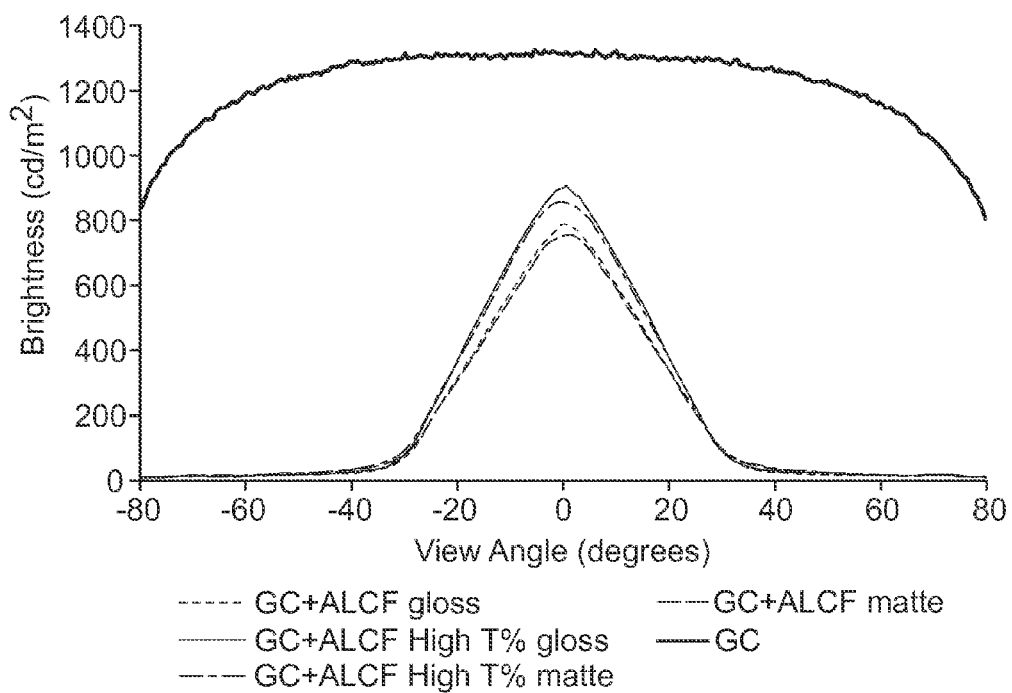
FIG. 6 is a plot of the brightness of various LCF films and orientations.
Figure 7:
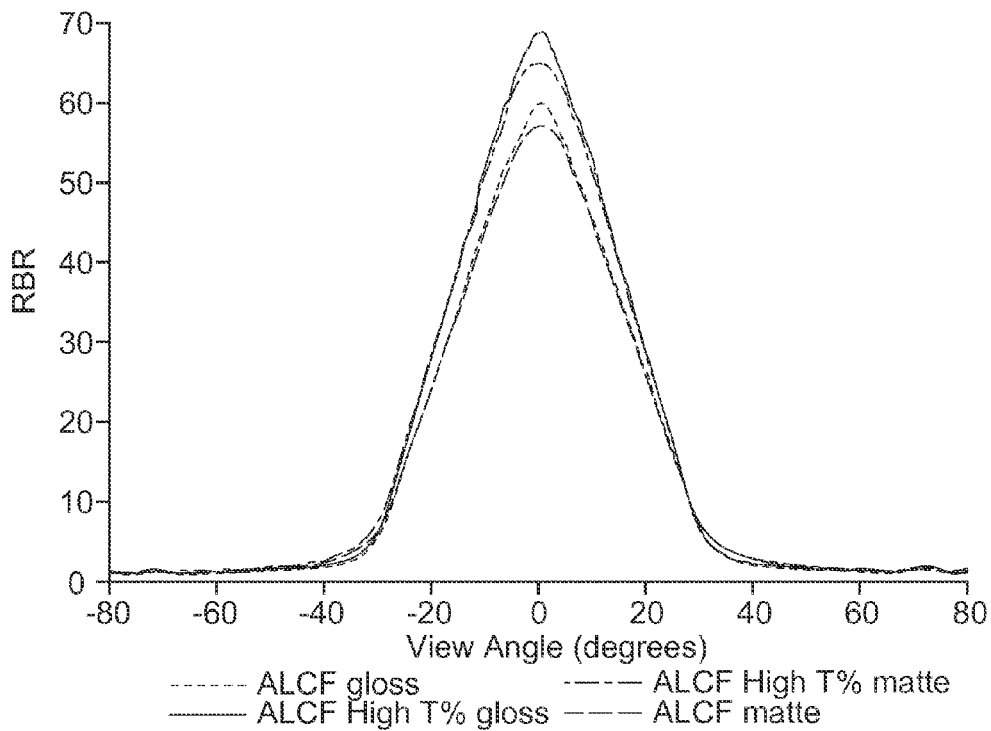
FIG. 7 is a plot of RBR versus horizontal view angle for various LCFs.
Figure 8:
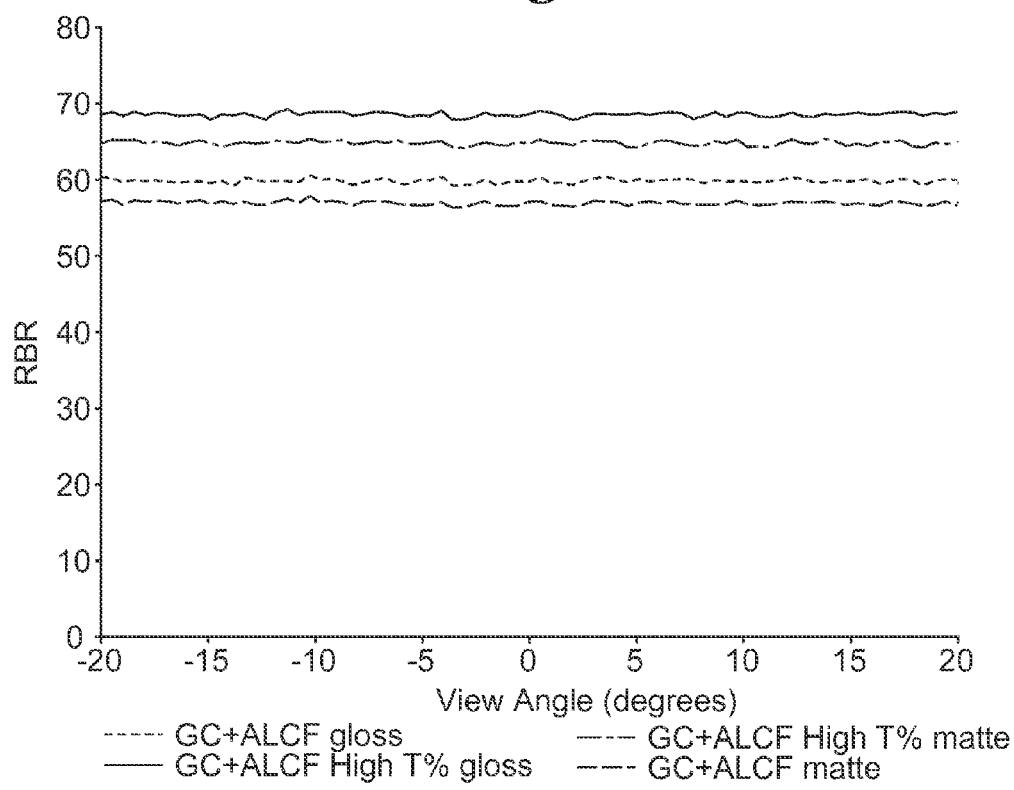
FIG. 8 is a plot of RBR versus vertical view angle for various LCFs.

An Eldim 80 Conoscope (Eldim Corp, France) was used to measure the luminance (brightness) profiles of the diffuse light source both with and without an LCF. The results from these measurements are shown at Table 2. The axial brightness (AB) was the brightness measured perpendicular to the surface of the LCF. The results are shown graphically in FIG. 6. In FIG. 6, GC refers to the diffusely transmissive hollow light box; GC+ALCF High T % gloss refers to Example Film 1 oriented with the glossy side toward the detector (and thus the viewer); GC+ALCF High T % matte refers to Example Film 1 oriented with the matte side toward the detector; GC+ALCF gloss refers to the Comparative Example Film A with the glossy side toward the detector; and GC+ALCF matte refers to Comparative Example Film A with the matte side toward the detector. The AB is also reported below as the RBR as measured with each the glossy side of the LCF facing the detector (thus simulating the glossy side facing the viewer), and with the matte side of the LCF facing the detector. In the LCF construction, the results for which are shown in Table 2, base substrate layer 260 (referring to FIG. 4) is the glossy side, and cover film 470 is the matte side. The RBR values for angles measured perpendicular to the louver directions (perpendicular to the absorptive regions) are shown in FIG. 7. The RBR values angles measured in the direction parallel to the louvers are shown in FIG. 8. Also reported below is the Effective Polar Viewing Angle (EPVA) defined as the angle at which the RBR is 5% or less. For absolute angular values greater than the EPVA, the RBR is also 5% or less. As can be seen from the table below, Example Film 1 provides higher on-axis RBR, while at the same time providing a substantially equivalent EPVA.

Also included in Table 2 is the MB20, as described above, derived from the data shown in FIG. 8. The data was taken similarly to the EPVA data, except that they were taken along a perpendicular axis to the EPVA measurement.

TABLE 2

| Sample Description | AB (RBR Matte) | AB (RBR Glossy) | EPVA[a] (Matte) (degrees) | EPVA[a] (Glossy) (degrees) | MB20 (Matte) | MB20 (Glossy) |
|---|---|---|---|---|---|---|
| Example Film 1 | 65 | 69 | 33 | 31.5 | 64 | 68 |
| Comparative Example Film A | 57 | 60 | 32 | 30.5 | 56 | 59 |

[a]For each EPVA, there is a corresponding negative angle value. For instance, Example Film 1 also has an EPVA of −33°.

Also measured was the bias angle for onset of moiré. This measurement was taken by qualitative human observations of the moiré pattern when using LCF on several different displays with a variety of pixel pitches. An LCF was placed on a display and rotated from a 0° bias to a bias where the moiré effect was no longer visibly noticeable. The severity of the moiré interferences varied as the LCF was rotated from a 0° bias to the bias angle for extinction of moiré, but beyond this angle, no moiré was observed. The results are shown in Table 3 below.

TABLE 3

| Display Type | Example Film 1 | Comparative Example Film A |
|---|---|---|
| Monitor 1[b] | [a] | 4.5° |
| Monitor 2[c] | [a] | 2.5° |
| Monitor 3[d] | 8.5° | 9.5° |

[a] No moiré was observed even at a 0° bias.
[b] 282 μm pixel pitch; 1920 × 1200 resolution
[c] 294 μm pixel pitch; 1280 × 1040 resolution
[d] 237 μm pixel pitch; 1280 × 800 resolution Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A light control film, comprising:
   a light input surface and a light output surface opposite the light input surface;
   alternating transmissive and absorptive regions disposed between the light input surface and the light output surface, each transmissive region having an index of refraction N1, and each absorptive region having an index of refraction N2, where N2-N1 is not less than −0.005;
   wherein the average pitch of successive absorptive regions of 0.070 mm or less; and
   wherein light incident to the light input surface exits the light output surface with a maximum relative brightness ratio (RBR) in a direction perpendicular to the light output surface of 65 or greater, and exits the light output surface with an effective polar viewing angle (EPVA) of 45° or less.

2. The light control film of claim 1 wherein the EPVA is 40° or less.

3. The light control film of claim 1 wherein the EPVA is 35° or less.

4. The light control film of claim 1 wherein N2 equals N1.

5. The light control film of claim 1 wherein N2-N1 is between −0.005 and 0.02.

6. The light control film of claim 1 wherein each absorptive region comprises an optically absorptive material selected from a pigment, a dye, or a combination thereof.

7. The light control film of claim 6 wherein the optically absorptive material is a carbon black pigment.

8. The light control film of claim 1 wherein each of the transmissive and absorptive regions comprise a radiation cured (meth)acrylate polymer.

9. The light control film of claim 1 wherein the first interface between each transmissive and absorptive region forms a first interface angle $\theta_I$ measured from a direction normal to the plane of the film, wherein first interface angle $\theta_I$ is 6° or less.

10. The light control film of claim 9 wherein first interface angle $\theta_I$ is 4° or less.

11. The light control film of claim 9 wherein the second interface between each transmissive and absorptive region forms a second interface angle $\theta_I$ measured from a direction normal to the plane of the film, wherein the second interface angle $\theta_I$ is 6° or less.

12. The light control film of claim 11 wherein second interface angle $\theta_I$ is 4° or less.

13. The light control film of claim 11 wherein first interface angle $\theta_I$ equals second interface angle $\theta_I$.

14. The light control film of claim 1 having an absorptive region width at its narrowest end of 12 μm or less.

15. The light control film of claim 1 having an absorptive region width at its narrowest end of 10 μm or less.

16. The light control film of claim 1 having an absorptive region width at its narrowest end of 8 μm or less.

17. The light control film of claim 1 having average pitch of successive absorptive regions of 0.065 mm or less.

18. The light control film of claim 1 having an MB20 of 60 or greater.

* * * * *

UNITED STATES PATENT AND TRADEMARK OFFICE
CERTIFICATE OF CORRECTION

PATENT NO. : 8,213,082 B2
APPLICATION NO. : 12/809358
DATED : July 3, 2012
INVENTOR(S) : Gary E Gaides It is certified that error appears in the above-identified patent and that said Letters Patent is hereby corrected as shown below:

Column 3
Lines 4-11, delete "This is done-----0.005." and insert the same on Col. 3, Line 3, after "reflections." as a continuation of the same paragraph.

Column 4
Line 53, delete "$\theta_P$" and insert -- $\Phi_P$ --, therefor.
Line 55, delete "$\theta_I$," and insert -- $\Phi_I$, --, therefor.
Line 58, delete "$\theta_P$" and insert -- $\Phi_P$ --, therefor.
Line 62, delete "$\theta_P$" and insert -- $\Phi_P$ --, therefor.

Column 5
Line 10, delete "$\Phi_T$," and insert -- $\theta_T$, --, therefor.
Line 36, delete "$\theta_P$," and insert -- $\Phi_P$, --, therefor.

Signed and Sealed this
Twenty-eighth Day of August, 2012

David J. Kappos
*Director of the United States Patent and Trademark Office*